July 2, 1963  A. L. SARTORIO  3,095,681
HAND-OPERATED IMPLEMENT FOR PICKING ON THE PLANT
OLIVES AND SIMILAR HANGING DOWN FRUITS
Filed March 24, 1961  2 Sheets-Sheet 1
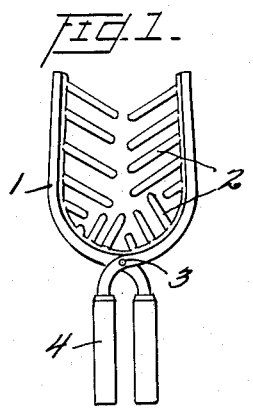
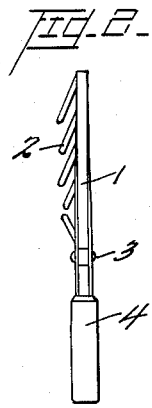
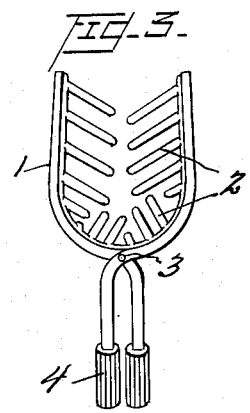
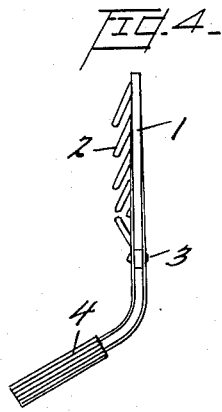
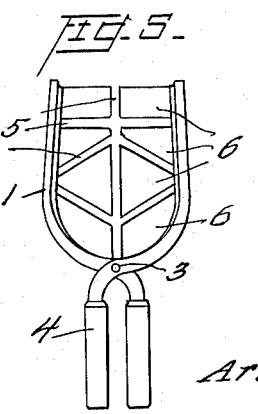
INVENTOR
Aristide L. Sartorio,
BY
Watson Cole Grindle + Watson
ATTORNEYS

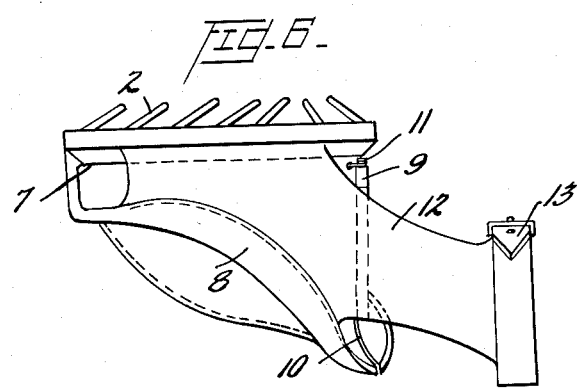
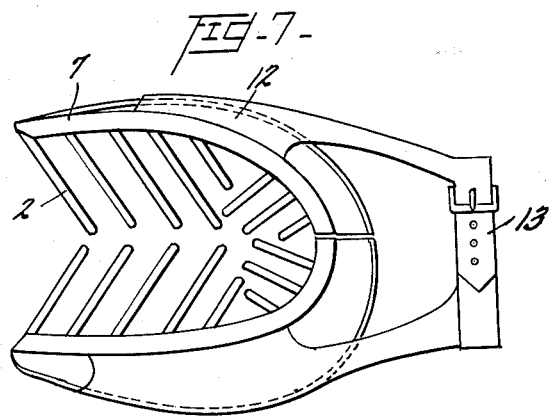
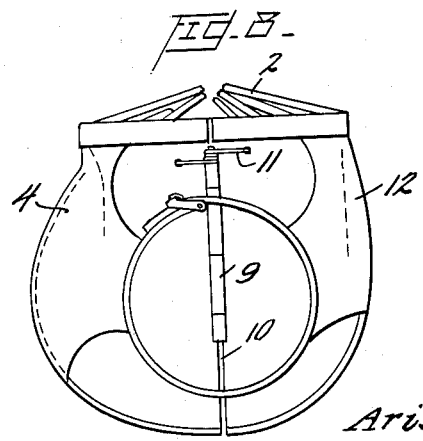

United States Patent Office 3,095,681
Patented July 2, 1963

3,095,681
HAND-OPERATED IMPLEMENT FOR PICKING ON THE PLANT OLIVES AND SIMILAR HANGING DOWN FRUITS
Aristide Lucio Sartorio, Piazza del Teatro 21, Velletri, Rome, Italy
Filed Mar. 24, 1961, Ser. No. 98,170
Claims priority, application Italy Mar. 26, 1960
2 Claims. (Cl. 56—339)

The object of the present invention is to provide an implement intended to pick fruit on the tree and by means of which, in order to protect the branches, the fruit is detached from the branches and caused to drop on the ground where generally a cloth is previously spread out.

According to a feature of the invention, the implement may be shaped like pincers having control handles, or with the handles replaced by a direct handgrip.

The invention is illustrated in the accompanying drawings in which:

FIG. 1 is a front view of the implement provided with handles;

FIG. 2 is a side view of the implement of FIG. 1;

FIGURES 3 and 4 are a front view and a side view, respectively, of a modified implement provided with bent handles;

FIG. 5 is a front view of the shears-shaped implement having straight handles as in FIGURES 1 and 2, but in which the teeth have the appearance of differently shaped partitions separated by spaces;

FIGURES 6, 7 and 8 are a side view, a plan view and a front view, respectively, of a modified implement without handles and in which the teeth are directly provided on the handgrip.

Referring to the drawings, the invention concerns an implement which by means of teeth 2 of suitable material located in such a way as to stay out of contact relative to each other nor interfere between each other. The devices generally comprise a 2-piece yoke or U-shaped frame 1, a pin 3 pivotally connecting said pieces together, a handle or handgrip 4 connected to each piece and spaced stripping teeth 2 mounted on each piece with the teeth on one piece extending toward the teeth on the other piece.

A very important feature of the invention resides in that the teeth 2 intended to comb the branches of the tree to detach the fruit therefrom, are disposed in a plane, so as to never contact each other and these teeth, if necessary, on fork 1 may be substituted by differently shaped walls 6, FIG. 5, and separted by spaces 5 in order to prove more suitable for picking fruit of a smaller diameter.

Another feature resides in that the handles 4, while always acting on the same pin 3, may be differently shaped, that is, they may be straight or bent, as shown in FIGURES 2 and 4, respectively.

Another important feature of the invention resides particularly in that the handles are substituted by a handgrip 7 on whose inner side, as already stated, the teeth 2 are provided and disposed in such a manner as not to get into contact between each other nor to be overlapped, in order to avoid any pressure on the fruit, which might damage them.

As shown in FIGURES 6, 7 and 8, the handgrip 7 laterally is provided with two suitably bent hips 8 to protect the operator's hand when causing the implement to slide on the branches. As shown in FIGURES 6 and 8, the handgrip 7 is provided with a hinge 9 which keeps the two sides of said handgrip joined by means of a pin 10 supporting also a spring 11 which normally keeps the handgrip open when the operator's hand does not exert any pressure.

Another important feature of the handgrip shown in FIGURES 6 to 8 consists in the provision of two tension elements 12 respectively adhering to one of the outer surfaces of said handgrip and which are connected by a band 13 to attach the implement to the operator's wrist.

A last characteristic feature resides in that to insert supporting bases for the teeth 2 both on the shears and on the handgrip there may be provided forks, preferably metal forks, having slide cavities.

The operation of this implement having the shape of shears or that of a direct handgrip is intended to detach the fruit and to cause it to drop down from the branches of the tree. In the case of an implement having the shape of shears the operator gets hold of the collecting element with one hand on the handles, whereas in the case of a collecting element having the shape of a handgrip, the operator will fasten it on the wrist after having gripped it with the wings 8 resting on the palm of the hand to protect it against the direct contact with the branches of the tree.

With the collecting element in the open position, the branch is inserted by starting from the side of the trunk of the tree, whereupon the implement is caused to slide in such a way as to cause the teeth 2 to drop down the fruit. These teeth, which are successively contacting the fruit, detach them and cause them to drop down.

As shown in FIG. 5, the teeth in both of the implements shown may be substituted by various surfaces, and these surfaces, which are also separated from each other, are particularly convenient for detaching and picking particularly small and delicate fruit.

The advantages which are obtained by the use of these implements for directly picking fruit on the branches of the tree have first of all an economical aim which is of particular interest for small farmers, insofar as the equipment required is minimum and the operation is actually reduced to the simple use of the picking element. Moreover, the easy use and operation represent another advantageous reason as compared with the known art insofar as in connection with the treatment of the tree and the fruit such measures are provided as otherwise would be missed.

As compared with other equipments intended to collect the fruit as they are successively dropping down, the operations performed by the implements according to the invention permit to carry out a quicker operation.

The invention has been described and illustrated by way of example only, without any limitation. Of course, it may undergo all such modifications of a constructional nature as may be suggested by the art and/or by putting it into effect, without thereby departing from the scope of the invention, such as to offset the planes supporting the teeth or detaching surfaces so as to facilitate entering of the branches.

What I claim is:
1. A hand-operated implement for picking olives and downwardly hanging fruit, comprising a fork having the shape of pincers, a plurality of spaced teeth on the inner side of the fork situated relative to each other so that they will not contact or overlap each other, said teeth permitting the branches to be gripped by the picking implement to slide there along without damaging the fruit with which it contacts when being detached from the branches, a handgrip controlled by the operator and divided into two parts and pivoted to each other, and a spring to urge the implement in the open position in the absence of pressure of the operator's hand on the inner surface of the handgrip.

2. A hand-operated implement for picking olives and downwardly hanging fruit, comprising a fork having the shape of pincers, a plurality of spaced teeth on the inner side of the fork situated relative to each other so that they will not contact or overlap each other, said teeth permitting the branches to be gripped by the picking implement to slide there along without damaging the fruit with which it contacts when being detached from the branches, and the teeth comprising differently shaped walls spaced from each other and which are particularly suitable for picking fruit of small diameter.

References Cited in the file of this patent

UNITED STATES PATENTS

| | | |
|---|---|---|
| 2,334,292 | Schaefer | Nov. 16, 1943 |
| 2,962,855 | Sartorio | Dec. 6, 1960 |